US009200586B2

(12) United States Patent
Inoue

(10) Patent No.: US 9,200,586 B2
(45) Date of Patent: Dec. 1, 2015

(54) ENGINE SYSTEM

(71) Applicant: YAMAHA HATSUDOKI KABUSHIKI KAISHA, Iwata-shi, Shizuoka (JP)

(72) Inventor: Hiroshi Inoue, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 300 days.

(21) Appl. No.: 13/928,479

(22) Filed: Jun. 27, 2013

(65) Prior Publication Data

US 2014/0007839 A1    Jan. 9, 2014

(30) Foreign Application Priority Data

Jul. 4, 2012   (JP) .................................. 2012-150726

(51) Int. Cl.
| | |
|---|---|
| *F02D 41/06* | (2006.01) |
| *F02D 43/00* | (2006.01) |
| *F02D 41/08* | (2006.01) |
| *F02D 37/02* | (2006.01) |
| *F02D 41/00* | (2006.01) |
| *F02M 69/32* | (2006.01) |
| *F02P 5/15* | (2006.01) |
| *F02D 31/00* | (2006.01) |
| *F02B 61/04* | (2006.01) |
| *F02N 11/00* | (2006.01) |

(52) U.S. Cl.
CPC ................ *F02D 43/00* (2013.01); *F02D 37/02* (2013.01); *F02D 41/0002* (2013.01); *F02D 41/061* (2013.01); *F02D 41/08* (2013.01); *F02M 69/32* (2013.01); *F02P 5/1506* (2013.01); *F02B 61/045* (2013.01); *F02D 31/005* (2013.01); *F02D 41/068* (2013.01); *F02D 41/086* (2013.01); *F02D 2200/021* (2013.01); *F02D 2200/0404* (2013.01); *F02D 2200/101* (2013.01); *F02D 2200/602* (2013.01); *F02N 11/00* (2013.01); *Y02T 10/42* (2013.01); *Y02T 10/46* (2013.01)

(58) Field of Classification Search
CPC ..... F02D 43/00; F02D 41/08; F02D 41/0002; F02D 31/005; F02D 41/062; F02M 69/32; F02P 5/1508; F02P 5/1506; F02B 61/045
USPC ................... 123/339.1, 339.11, 339.23, 399, 123/406.52, 406.53; 701/103, 110, 113
See application file for complete search history.

(56) References Cited

U.S. PATENT DOCUMENTS

2005/0272320 A1   12/2005  Masui et al.

FOREIGN PATENT DOCUMENTS

| JP | 62-218640 | * | 9/1987 | .............. F02D 43/00 |
|---|---|---|---|---|
| JP | 62-261646 | * | 11/1987 | .............. F02D 43/00 |
| JP | 6-80306 B2 | | 10/1994 | |
| JP | 2001-152895 | * | 6/2001 | .............. F02D 29/02 |
| JP | 2005-042706 A | | 2/2005 | |
| JP | 2005-319881 A | | 11/2005 | |
| JP | 2009-208606 A | | 9/2009 | |
| JP | 2010-038129 A | | 2/2010 | |

* cited by examiner

*Primary Examiner* — Hai Huynh
(74) *Attorney, Agent, or Firm* — Keating and Bennett, LLP

(57) ABSTRACT

An engine system includes an engine, an air intake passage to supply air to the engine, a throttle valve provided in the air intake passage to adjust a throttle opening degree that is an opening degree of the air intake passage, a bypass passage to supply air to the engine while bypassing the throttle valve, an on/off valve provided in the bypass passage to open and close the bypass passage, and a control unit that performs ignition lag control of the engine to control an output of the engine when the on/off valve is in an open state.

19 Claims, 11 Drawing Sheets

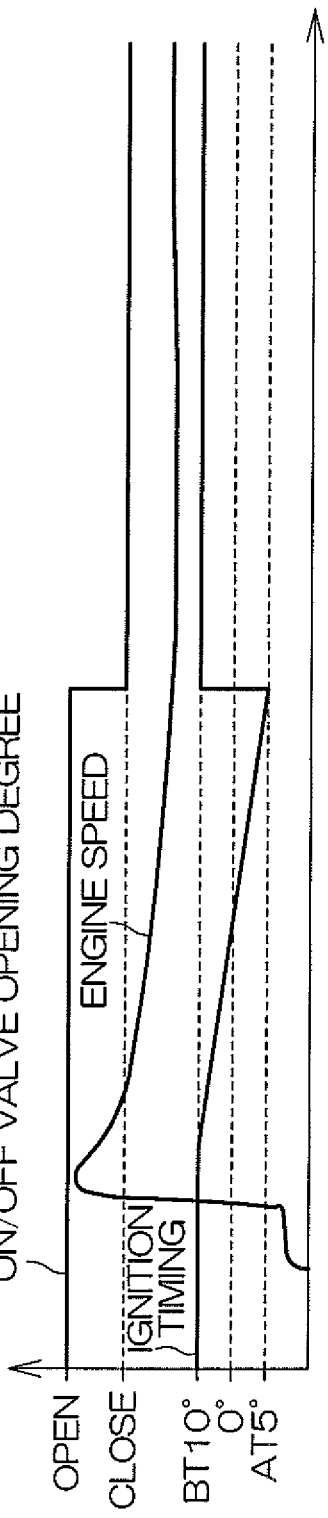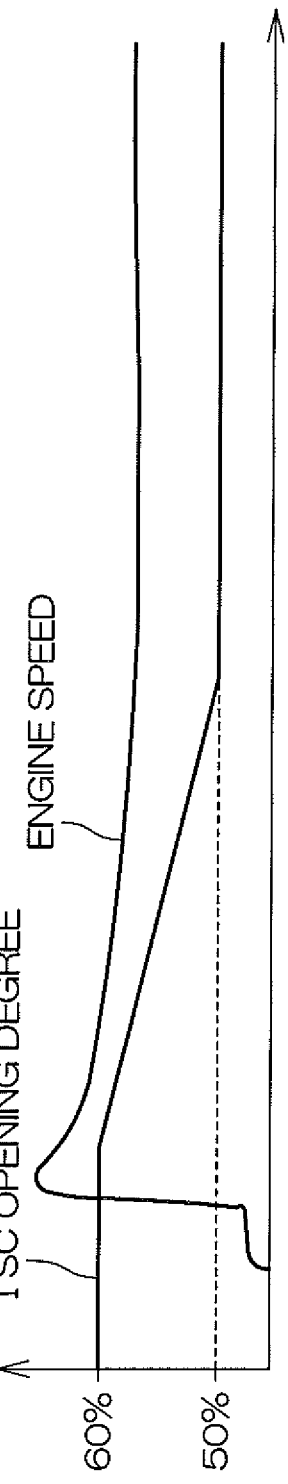

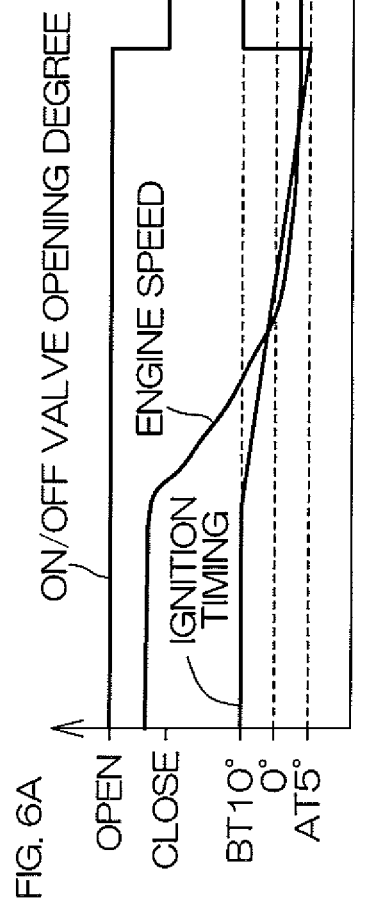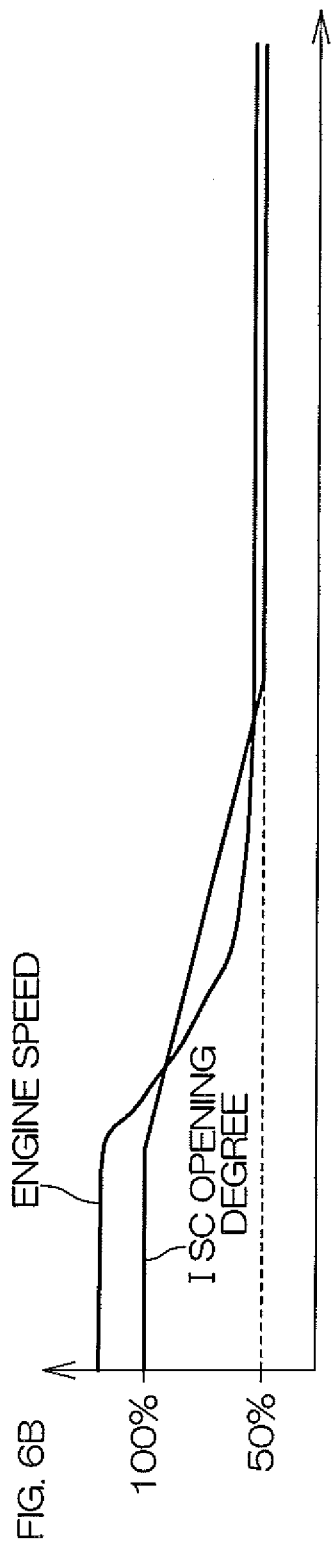

FIG. 8

WARM-UP MAP EXAMPLE

| TEMPERATURE | -40 | -30 | -20 | -10 | 0 | 10 | 20 | 30 | 40 | 50 | 60 |
|---|---|---|---|---|---|---|---|---|---|---|---|
| ENGINE SPEED (rpm) | 1500 | 1450 | 1400 | 1350 | 1300 | 1250 | 1200 | 1150 | 1100 | 1050 | 1000 |

ENGINE SYSTEM

BACKGROUND OF THE INVENTION

1. Field of the Invention

The present invention relates to an engine system including a bypass passage that bypasses a throttle valve provided in an air intake passage that supplies air to an engine.

2. Description of the Related Art

US2005/0272320 A1 discloses a vessel propulsion system that drives a propeller with an internal combustion engine. The propulsion system includes a throttle valve disposed in an air intake passage of the engine, a secondary air passage that places a portion of the air intake passage downstream of the throttle valve in communication with the atmosphere, and an idle speed control valve (ISC valve) disposed in the secondary air passage. When the throttle valve is fully closed, the ISC valve is feedback-controlled based on an engine speed to adjust an intake air amount taken in via the secondary air passage. Thus, the engine speed is controlled to be at an idling speed that is set in advance. A dash pot control using the ISC valve is also performed. In the dash pot control, the occurrence of an engine stall upon performing a rapid valve closing operation of the throttle valve is avoided by opening the ISC valve to correct an insufficiency of the intake air amount. Specifically, when an opening degree of the throttle valve is large, a large amount of fuel is supplied to the engine. When the throttle valve is rapidly closed from this state, a proportion of the air amount with respect to the fuel supplied inside the engine becomes insufficient, a mixing ratio of fuel to air degrades rapidly, which leads to engine stall. The engine stall can be avoided by opening the ISC valve to compensate for the insufficiency in the amount of air.

SUMMARY OF THE INVENTION

The inventor of preferred embodiments of the present invention described and claimed in the present application conducted an extensive study and research regarding engine systems, such as the one described above, and in doing so, discovered and first recognized new unique challenges and previously unrecognized possibilities for improvements as described in greater detail below.

With the ISC valve, the opening degree can be adjusted to an intermediate opening degree between fully closed and fully open states by control with a control unit. Thus, the arrangement is complicated and consequently large in structure and high in cost. The ISC valve thus impedes a size reduction and a cost reduction, especially in compact mechanical apparatuses such as motorcycles, lawnmowers, etc.

The present inventor thus examined the use of an on/off valve, which can take on only the two states of an open state of opening the air passage and a closed state of closing the air passage, in place of the ISC valve. However, with the on/off valve, an abrupt change of the air amount occurs when switching between the open state and the closed state because the on/off valve cannot take on a state of an intermediate opening degree between the open state and the closed state. Thus, the engine speed cannot be stabilized and marketability of the mechanical apparatus may be compromised.

In order to overcome the previously unrecognized and unsolved challenges described above, a preferred embodiment of the present invention provides an engine system including an engine, an air intake passage that supplies air to the engine, a throttle valve provided in the air intake passage to adjust a throttle opening degree that is an opening degree of the air intake passage, a bypass passage that supplies air to the engine while bypassing the throttle valve, an on/off valve provided in the bypass passage to open/close the bypass passage, and a control unit programmed to perform ignition lag control of the engine to control an output of the engine when the on/off valve is in an open state.

With the above-described arrangement, the on/off valve is disposed in the bypass passage. When the on/off valve is in the open state, ignition lag control of the engine is performed. The on/off valve is put in the open state so that air can be supplied to the engine even when the throttle valve is fully closed. Ignition lag control of the engine is performed to enable adjustment of the output of the engine, in particular, the engine speed. Thus, the output of the engine can be finely adjusted to realize stable operation of the engine even without using a valve that adjusts the opening degree to an intermediate opening degree between fully closed and fully open state.

In a preferred embodiment of the present invention, the control unit is programmed to judge whether or not the engine is in a starting period. When the control unit judges that the engine is in the starting period, it controls the on/off valve to be in the open state and thereafter executes the ignition lag control of the engine. With the above-described arrangement, the on/off valve is put in the open state when the engine is in the starting period, and the ignition lag control of the engine is executed thereafter. Therefore, even when the throttle valve is in the closed state, air can be delivered into the engine and the engine speed can be controlled by the ignition lag control. That is, the starting of the engine and subsequent adjustment of the engine speed can be performed without using a valve having an adjustable opening degree, that is, a valve controllable to an intermediate opening degree besides fully open and fully closed state. The engine starting period is preferably a period from turning on of a power supply to the control unit to completion of the starting of the engine.

In a preferred embodiment of the present invention, the control unit is programmed to further judge whether or not the starting of the engine is completed, and starts the ignition lag control of the engine after the starting of the engine has been completed. With the above-described arrangement, when the engine is to be started, ignition control at an ordinary ignition timing is performed so that the engine can be started reliably. By thereafter performing ignition lag control of the engine, the engine output can be adjusted and the engine speed can be controlled. The starting of the engine being completed is preferably judged based on the engine speed exceeding a predetermined threshold (for example, a value no less than a minimum engine speed in a complete combustion state).

In a preferred embodiment of the present invention, when, after starting the ignition lag control, the engine speed decreases and reaches a predetermined engine speed range, the control unit controls the on/off valve to be in the closed state and ends the ignition lag control of the engine. With the above-described arrangement, when the engine speed decreases due to ignition lag control and reaches the predetermined engine speed range (more specifically, an idling engine speed range), the on/off valve is put in the closed state, the ignition lag control is ended, and the ignition timing of the engine is returned to the ordinary ignition timing. Thus, the control unit can end the adjustment of the engine output by the ignition lag control and perform engine output control in accordance with the opening degree of the throttle valve.

In a preferred embodiment of the present invention, when, after starting the ignition lag control, the engine speed decreases and reaches a predetermined engine speed range, the control unit is programmed to wait for a predetermined time to elapse and thereafter control the on/off valve to be in the closed state and ends the ignition lag control of the engine. With the above-described arrangement, after the engine speed has decreased to the predetermined engine speed range, the control unit waits for the predetermined time to elapse before closing the on/off valve and ending the ignition lag control. Thus, the ignition lag control can be ended and transition to engine output control in accordance with the opening degree of the throttle valve can be performed after the state of the engine has stabilized. Thus, smooth transition among control modes is made possible.

In a preferred embodiment of the present invention, the control unit executes the ignition lag control of the engine when a temperature of the engine is higher than a predetermined temperature. When the ignition lag control is performed in a state in which the temperature of the engine is low, engine stall may occur. This problem can be avoided by the above arrangement.

In a preferred embodiment of the present invention, the control unit is programmed to control the on/off valve to be in the open state when the throttle opening degree is no less than a first opening degree, and, when from this state, the throttle opening degree becomes no more than a second opening degree that is less than the first opening degree, to execute the ignition lag control of the engine while maintaining the on/off valve in the open state. That is, when the engine is in operation with the throttle opening degree being no less than the first opening degree, the on/off valve is in the open state. When in this state, the throttle opening degree becomes no more than the first opening degree, the open state of the on/off valve is maintained. Therefore, even if the throttle valve is closed rapidly, air is delivered into the engine via the bypass passage to enable the insufficiency in the amount of air to be avoided and enable engine stall to be avoided. The ignition lag control of the engine is executed with the on/off valve being kept in the open state and, thus, the engine output (engine speed) can be controlled in accordance with the throttle opening degree.

In a preferred embodiment of the present invention, the control unit is programmed to set a target engine speed of the engine in accordance with the throttle opening degree when the throttle opening degree is no more than the second opening degree, to set the target engine speed of the engine to an idling engine speed when the throttle opening degree is no more than a third opening degree that is less than the second opening degree, and to perform ignition lag control of the engine in accordance with the target engine speed when the throttle opening degree is in an opening degree region no more than the second opening degree. When the throttle opening degree is in a range between the second opening degree and the third opening degree, the ignition lag control of the engine is performed in accordance with the target engine speed set in accordance with the throttle opening degree. Thus, an engine speed that is in accordance with the throttle opening degree is achieved. The engine speed can thus be controlled accurately in accordance with the throttle opening degree even when the engine speed is of a small value, and operability (especially operability related to output adjustment) of a mechanical apparatus can thus be improved without providing a valve having an adjustable opening degree. On the other hand, when the throttle opening degree is no more than the third opening degree, the target engine speed is set to the idling engine speed and thus the engine speed is made to approach the idling engine speed by the ignition lag control of the engine.

In a preferred embodiment of the present invention, when after the throttle opening degree becomes no more than the third opening degree, the engine speed decreases and reaches a predetermined idling engine speed range, the control unit controls the on/off valve to be in the closed state and ends the ignition lag control of the engine. With the above-described arrangement, when the engine speed has decreased sufficiently and has reached the idling engine speed range due to the ignition lag control, the adjustment of the engine output by the on/off valve and the ignition lag control is ended to enable transition to engine control at the normal ignition timing.

In a preferred embodiment of the present invention, when after the throttle opening degree becomes no more than the third opening degree, the engine speed decreases and reaches a predetermined idling engine speed range, the control unit is programmed to wait for a predetermined time to elapse and thereafter to control the on/off valve to be in the closed state and ends the ignition lag control of the engine. With the above-described arrangement, when after the engine speed has decreased to the idling engine speed range, the control unit waits for the elapse of the predetermined time before closing the on/off valve and ending the ignition lag control. Thus, the ignition lag control can be ended and transition to engine control at the ordinary ignition timing is performed after the state of the engine has stabilized. Thus, smooth transition among control modes is enabled.

In a preferred embodiment of the present invention, the engine is a driving source of a propulsion system of a vessel. In many cases, the engine that is used as the driving source of the propulsion system of the vessel is used with the throttle being in either a fully open state or a fully closed state. For example, in a case of a propulsion system with which a propeller is rotated by an engine, an engine stall occurs easily when the throttle valve is rapidly closed and put in the fully closed state from a state in which an operation is being performed with the throttle being fully open. This is because the air amount supplied to the engine becomes insufficient due to the rapid closing of the throttle and, additionally, the propeller tends to stop abruptly due to resistance received from water. With a vehicle traveling on ground, even if the throttle is closed rapidly, wheels are turned by a vehicle body traveling due to inertia, and because the engine is thus made to rotate, an engine stall rarely occurs. The preferred embodiments of the present invention are thus especially effective in a propulsion system of a vessel.

In a preferred embodiment of the present invention, the engine system further includes a trolling output operation unit that is operated by an operator to adjust the output of the engine during trolling and the control unit is programmed to vary the output of the engine in accordance with the operation of the trolling output operation unit. With the above-described arrangement, when the operator operates the trolling output operation unit, the output of the engine is varied by the ignition lag control in the state in which the on/off valve is opened. Thus, fine adjustment of the engine output can be performed. That is, fine adjustment of the engine output can be performed without using a valve having an adjustable opening degree and thus fine adjustment of the engine output during trolling can be performed despite the engine system being of a compact, inexpensive arrangement.

In a preferred embodiment of the present invention, the control unit is programmed to set, with the output of the engine during idling as a reference output, an amount of variation of the engine output from the reference output by controlling the opening/closing of the on/off valve and the ignition timing in accordance with the operation of the trolling output operation unit. With the above-described arrangement, both the opening/closing of the on/off valve and the ignition timing are controlled on the basis of the engine output during idling and in accordance with the operation of the trolling output operation unit. Thus, fine adjustment of the engine output by the variation amount that is based on the engine output during idling and is in accordance with the operation of the trolling output operation unit can be performed.

In a preferred embodiment of the present invention, the trolling output operation unit is arranged to output commands in a plurality of steps in accordance with the operation by the operator, and, in accordance with the commands output from the trolling output operation unit, the control unit is programmed to vary the engine output with respect to the reference output by variation amounts in a plurality of steps. With the above-described arrangement, the engine output can be finely adjusted by the stepped variation amounts in accordance with the operation of the trolling output operation unit. Fine adjustment of the engine output can thus be performed by an easy operation.

In a preferred embodiment of the present invention, the trolling output operation unit includes an output increasing operating member to increase the engine output and the control unit increases the engine output by a predetermined amount in response to operation of the output being increased. Also in a preferred embodiment of the present invention, the trolling output operation unit includes an output decreasing operating member to decrease the engine output and the control unit decreases the engine output by a predetermined amount in response to operation of the output decreasing operating member. With these arrangements, the engine output is increased or decreased by the predetermined amount in response to the operation of the output increasing operating member or the output decreasing operating member. Operation of the trolling output operation unit is thus simple and there is no difficulty in the fine adjustment of the engine output. A user can thus finely adjust the engine output by an easy operation.

In a preferred embodiment of the present invention, the control unit is programmed to vary the target engine speed on a basis of a reference target engine speed that is in accordance with the reference output and controls the engine so that the target engine speed is attained. With the above-described arrangement, the target engine speed is determined based on the reference target engine speed, and the engine output is controlled by adjustment of the ignition timing based on the target engine speed. The engine output can thus be adjusted accurately and appropriately.

In a preferred embodiment of the present invention, the control unit includes a plurality of control modes including an ordinary mode of controlling the engine output in accordance with an operation amount of an accelerator operation unit and a trolling mode of varying the engine output in accordance with the operation of the trolling output operation unit. With the above-described arrangement, the control unit includes a plurality of control modes and the control modes include the ordinary mode and the trolling mode. In the trolling mode, the engine output is adjusted in accordance with the operation of the trolling output operation unit. By switching the control mode, the engine output during trolling can be varied in accordance with the operation of the trolling output operation unit and, the engine output can be varied in accordance with the operation of the accelerator operation unit during ordinary running.

In a preferred embodiment of the present invention, the control unit in the trolling mode cancels the trolling mode in response to an operation amount of the accelerator operation unit becoming no less than a predetermined operation amount or in response to the operation amount of the accelerator operation unit varying by no less than a predetermined value from when the trolling mode was started. With the above-described arrangement, the trolling mode is cancelled and a return to the ordinary mode is performed when the operation amount of the accelerator operation unit becomes no less than the predetermined operation amount or when the operation amount of the accelerator operation unit varies by no less than the predetermined value. The control mode can thus be made to change from the trolling mode to the ordinary mode by operating the accelerator operation unit and, thereafter, the engine output is varied in accordance with the operation of the accelerator operation unit. The switching of the control mode can thus be performed without making the user feel a sense of incongruity.

In a preferred embodiment of the present invention, the control unit is programmed to vary the engine output by opening the on/off valve and making the ignition timing lag when the target engine speed is no less than a predetermined first threshold and closing the on/off valve and making the ignition timing lead when the target engine speed is less than a predetermined second threshold. With the above-described arrangement, the on/off valve is opened and the ignition timing is made to lag or the on/off valve is closed and the ignition timing is made to lead in accordance with the target engine speed and the engine output is varied. Thus, the engine output can be adjusted by an appropriate method in accordance with the target engine speed. For example, when the engine output is to be finely adjusted beyond the idling rotation range, it is appropriate to put the on/off valve in the open state to increase the intake air amount for the engine and perform ignition lag control. On the other hand, when the engine speed is to be made lower than the idling engine speed, it is appropriate to close the on/off valve to restrict the intake air amount and perform ignition lead control in this state. Thus, a width of engine output adjustment by opening/closing of the on/off valve and control of the ignition timing can be enlarged.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5A is a diagram for describing a characteristic control operation that is performed when the engine is started. FIG. 5B is a diagram of a control in a comparative example that includes an idle speed control valve.

FIG. 6A is a diagram of a non-limiting example of dash pot control in a preferred embodiment of the present invention. FIG. 6B is a diagram of a dash pot control according to the comparative example that includes the idle speed control valve.

FIG. 8 shows a specific non-limiting example of a warm-up map that is referenced in warming up the engine.

DETAILED DESCRIPTION OF THE PREFERRED EMBODIMENTS

Figure 1:
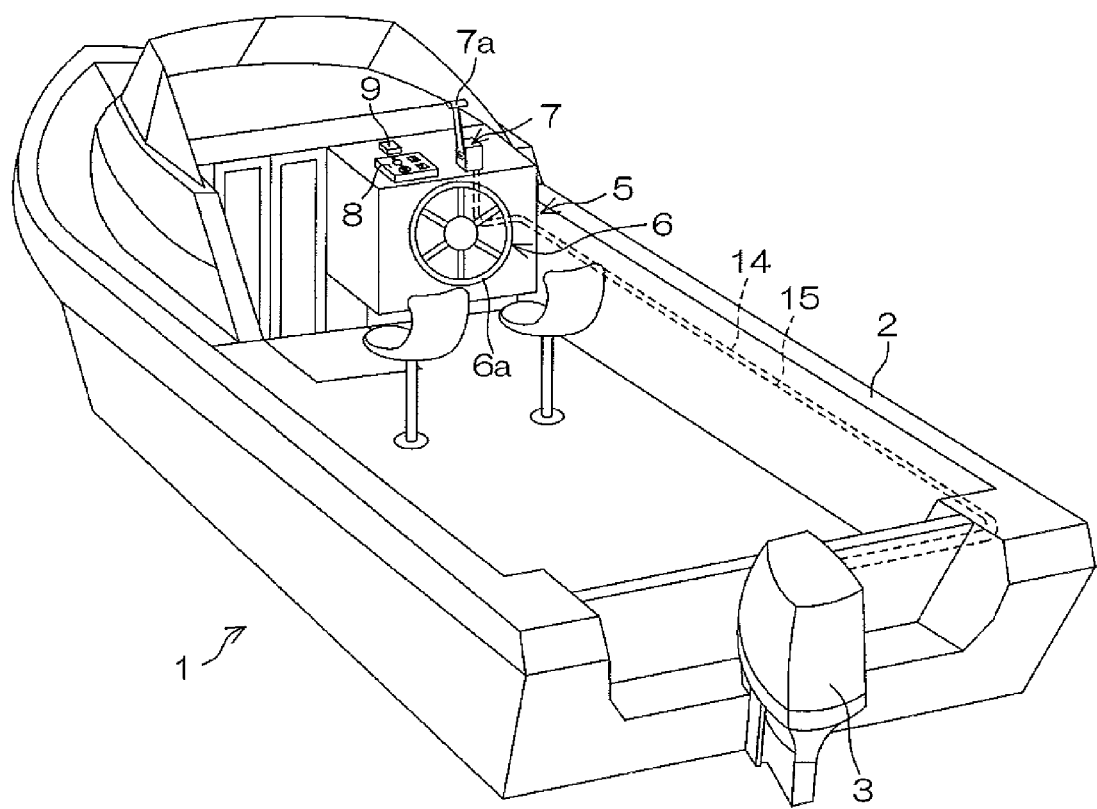
FIG. 1 is a perspective view for describing an arrangement of a vessel to which an engine system according to a preferred embodiment of the present invention is applied.

FIG. 1 is a perspective view for describing a vessel according to a preferred embodiment of the present invention. The vessel 1 includes a hull 2 and an outboard motor 3 as a propulsion device. The outboard motor 3 is attached to a stern of the hull 2. The outboard motor 3 includes an engine, preferably an internal combustion engine, and generates a propulsive force by a propeller that is rotated by a driving force of the engine.

A vessel operator compartment 5 is provided at a front portion (stem side) of the hull 2. The vessel operator compartment 5 includes a steering operation apparatus 6, a remote controller 7, an operation panel 8, and a gauge 9.

The steering operation apparatus 6 includes a steering wheel 6a that is rotatingly operated by a vessel operator. The operation of the steering wheel 6a is mechanically transmitted by a steering cable (not shown) to a steering mechanism (not shown) provided at the stern. The steering mechanism rotates the outboard motor 3 to the right and left to change its direction. As a result, a direction of the propulsive force generated by the outboard motor 3 is changed and a heading direction of the vessel 1 can be changed accordingly. A power steering device that includes a sensor detecting a steering operation angle of the steering wheel 6a and an actuator driven in accordance with the steering operation angle detected by the sensor may be used. In this case, there is no mechanical coupling between the steering wheel 6a and the steering mechanism, the actuator is driven by a control signal that is in accordance with the steering wheel operation, and the outboard motor 3 is steered by a driving force of the actuator.

The remote controller 7 is a non-limiting example of an accelerator operation unit. The remote controller 7 includes a lever 7a that can be inclined to the front and rear, and an operation of the lever 7a is transmitted to the outboard motor 3 via a throttle cable 14 and a shift cable 15. The throttle cable 14 is coupled to a throttle valve of the engine included in the outboard motor 3. Also, the shift cable 15 is coupled to a shift mechanism included in the outboard motor 3. By transmission of the operation of the lever 7a by the shift cable 15, a shift position of the outboard motor 3 is set at a forward drive position when the lever 7a is inclined forward from a predetermined neutral position to a predetermined forward drive shift-in position. As a result, a propulsive force in the forward drive direction is generated from the outboard motor 3. Also, when the lever 7a is inclined rearward from the neutral position to a predetermined reverse drive shift-in position, the shift position of the outboard motor 3 is set at a reverse drive position and a propulsive force in the reverse drive direction is generated from the outboard motor 3. When the lever 7a is at a position between the forward drive shift-in position and the reverse drive shift-in position, the shift position of the outboard motor 3 is set at a neutral position and the outboard motor 3 does not generate a propulsive force. Also, by the operation of the lever 7a being transmitted by the throttle cable 14, a throttle opening degree changes in accordance with an inclination amount of the lever 7a and an output of the outboard motor 3, that is, an engine speed of the engine included in the outboard motor 3 can thus be changed. More specifically, by inclining the lever 7a farther forward from the forward drive shift-in position, the throttle opening degree can be increased to increase the output of the outboard motor 3 and cause a large propulsive force in the forward drive direction to be generated from the outboard motor 3. Similarly, by inclining the lever 7a farther rearward from the reverse drive shift-in position, the throttle opening degree can be increased to increase the output of the outboard motor 3 and cause a large propulsive force in the reverse drive direction to be generated from the outboard motor 3.

In the outboard motor 3, a target engine speed is set in accordance with the throttle opening degree. Specifically, up to the inclination position of the predetermined amount (between the forward drive shift-in position and the reverse drive shift-in position), the throttle opening degree is set to fully closed state and accordingly, the target engine speed is set to an idling engine speed. A range of the engine speed no more than the idling engine speed is an idling engine speed range. When the lever 7a is inclined forward beyond the forward drive shift-in position or inclined rearward beyond the reverse drive shift-in position, the throttle opening degree increases with an increasing lever inclination amount and the target engine speed increases accordingly.

The gauge 9 displays a state of the outboard motor 3. More specifically, on/off of a power supply of the outboard motor 3, the engine speed, and other necessary information are displayed.

Figure 2:
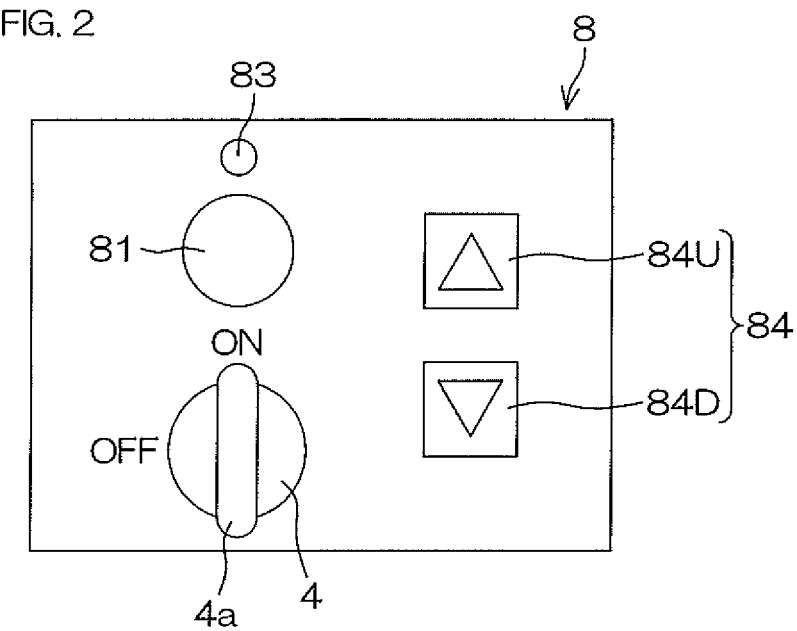
FIG. 2 is an enlarged plan view of an operation panel provided in the vessel.

As shown in an enlarged manner in FIG. 2, the operation panel 8 includes a key switch 4, a start/stop switch 81, a power supply lamp 83, and a trolling output operation portion 84.

The key switch 4 is a switch that is operated to turn on the power supply of the outboard motor 3. The key switch 4 can be operated between an off position (OFF) and an on position (ON) upon insertion of a corresponding key 4a into a key cylinder. The off position is an operation position for interrupting the power supply to the outboard motor 3. The on position is an operation position for turning on the power supply to the outboard motor 3. The power supply lamp 83 includes, for example, an LED lamp and is an indicator that lights up when the power supply to the outboard motor 3 is turned on and becomes unlit when the power supply is turned off.

The start/stop switch 81 is a switch that is operated for starting/stopping the engine of the outboard motor 3 and may be, for example, a momentary switch. By operating the start/stop switch 81 in an engine-stopped state, a starting command to start the engine of the outboard motor 3 can be generated. Also, by operating the start/stop switch 81 while the engine is in operation, a stop command to stop the engine of the outboard motor 3 can be generated.

The trolling output operation portion 84 includes an output increasing switch 84U that increases the engine output by a predetermined amount and an output decreasing switch 84D that decreases the engine output by a predetermined amount. The output increasing switch 84U is a non-limiting example of an output increasing operating member and the output decreasing switch 84D is a non-limiting example of an output decreasing operating member. By operating the switches 84U and 84D, the engine speed can be increased/decreased in a stepwise manner with the idling engine speed as a reference target engine speed, and thus engine output can be finely adjusted. The trolling output operation portion 84 is used to cause the vessel 1 to run with the engine output fixed, typically when trolling is to be performed. Trolling refers to a vessel travel mode to cause the vessel 1 to travel at a fixed speed or to keep the vessel 1 at a fixed point against a tidal current or wind.

Figure 3:
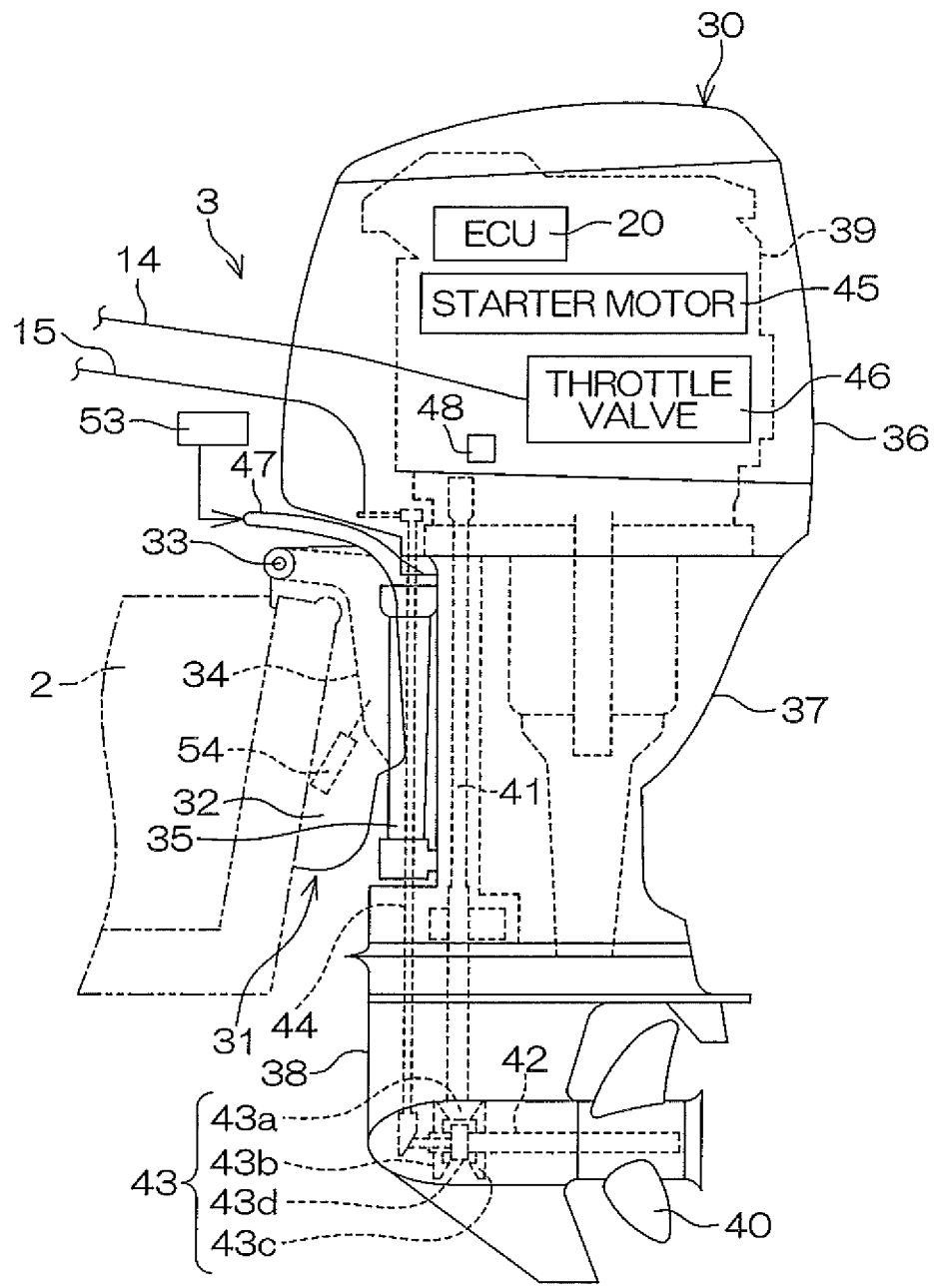
FIG. 3 is a diagram for describing an outboard motor that is a propulsion device of the vessel.

FIG. 3 is a diagram for describing the outboard motor 3. The outboard motor 3 includes a propulsion unit 30 and an attachment mechanism 31 arranged to attach the propulsion unit 30 to the hull 2. The attachment mechanism 31 includes a clamp bracket 32 detachably fixed to a transom of the hull 2, and a swivel bracket 34 coupled to the clamp bracket 32 in a manner enabling rotation around a tilt shaft 33 as a horizontal rotational axis. The propulsion unit 30 is attached to the swivel bracket 34 in a manner enabling rotation around a steering shaft 35. A steering angle (azimuth angle defined by the direction of the propulsive force with respect to a center line of the hull 2) can thus be changed by rotating the propulsion unit 30 around the steering shaft 35. Also, a trim angle of the propulsion unit 30 can be changed by rotating the swivel bracket 34 around the tilt shaft 33. The trim angle corresponds to an angle of attachment of the outboard motor 3 with respect to the hull 2.

A housing of the propulsion unit 30 includes a top cowling 36, an upper case 37, and a lower case 38. Inside the top cowling 36, the engine 39, which is a driving source, is installed with an axis of a crankshaft thereof extending vertically. A driveshaft 41 for power transmission is connected to a lower end of the crankshaft of the engine 39 and extends vertically through the upper case 37 and into the lower case 38.

A propeller 40 is rotatably attached as a propulsive force generating member to a lower rear side of the lower case 38. A propeller shaft 42, which is a rotation shaft of the propeller 40, extends horizontally in the lower case 38. The rotation of the driveshaft 41 is transmitted to the propeller shaft 42 via a shift mechanism 43 as a clutch mechanism.

The shift mechanism 43 includes a drive gear 43a, preferably a bevel gear, fixed to a lower end of the driveshaft 41, a forward drive gear 43b, preferably a bevel gear, rotatably disposed on the propeller shaft 42, a reverse drive gear 43c, preferably a bevel gear, rotatably disposed similarly on the propeller shaft 42, and a dog clutch 43d disposed between the forward drive gear 43b and the reverse drive gear 43c.

The forward drive gear 43b is engaged with the drive gear 43a from a front side, and the reverse drive gear 43c is engaged with the drive gear 43a from a rear side. The forward drive gear 43b and the reverse drive gear 43c thus rotate in mutually opposite directions.

The dog clutch 43d is spline-coupled to the propeller shaft 42. That is, the dog clutch 43d can slide with respect to the propeller shaft 42 in the axial direction of the shaft 42 but is not rotatable relative to the propeller shaft 42 and rotates together with the propeller shaft 42.

The dog clutch 43d slides on the propeller shaft 42 by axial rotation of a shift rod 44 that extends vertically and in parallel to the driveshaft 41. Thus, the dog clutch 43d is controlled to be set at a shift position among a forward drive position coupled to the forward drive gear 43b, a reverse drive position coupled to the reverse drive gear 43c, and a neutral position not coupled to either the forward drive gear 43b or the reverse drive gear 43c.

When the dog clutch 43d is at the forward drive position, the rotation of the forward drive gear 43b is transmitted to the propeller shaft 42 via the dog clutch 43d. Thus, the propeller 40 is rotated in one direction (forward drive direction) to generate a propulsive force in a direction for moving the hull 2 forward. On the other hand, when the dog clutch 43d is at the reverse drive position, the rotation of the reverse drive gear 43c is transmitted to the propeller shaft 42 via the dog clutch 43d. The reverse drive gear 43c rotates in a direction opposite to that of the forward drive gear 43b, and the propeller 40 is thus rotated in an opposite direction (reverse drive direction) to generate a propulsive force in a direction for moving the hull 2 in reverse. When the dog clutch 43d is at the neutral position, the rotation of the driveshaft 41 is not transmitted to the propeller shaft 42. That is, a driving force transmission path between the engine 39 and the propeller 40 is interrupted so that a propulsive force is not generated in any direction.

In association with the engine 39, a starter motor 45 to start the engine 39 is disposed. The starter motor 45 is controlled by an ECU (electronic control unit) 20 as a control unit. The engine 39 further includes an engine speed sensor 48 that detects a rotational speed of the engine 39 by detecting the rotation of the crankshaft.

The throttle valve 46 is disposed in an air intake passage of the engine 39. The throttle cable 14 is coupled to the throttle valve 46. The shift cable 15 is coupled to the shift rod 44.

A steering mechanism 53, driven by the steering operation apparatus 6 (see FIG. 1), is coupled to a steering rod 47 fixed to the propulsion unit 30. The propulsion unit 30 is rotated around the steering shaft 35 by the steering mechanism 53 and a steering operation can thus be performed.

A trim actuator (tilt/trim actuator) 54, which includes, for example, a hydraulic cylinder and is controlled by the ECU 20, is provided between the clamp bracket 32 and the swivel bracket 34. The trim actuator 54 rotates the swivel bracket 34 around the tilt shaft 33 to rotate the propulsion unit 30 around the tilt shaft 33.

Figure 4:
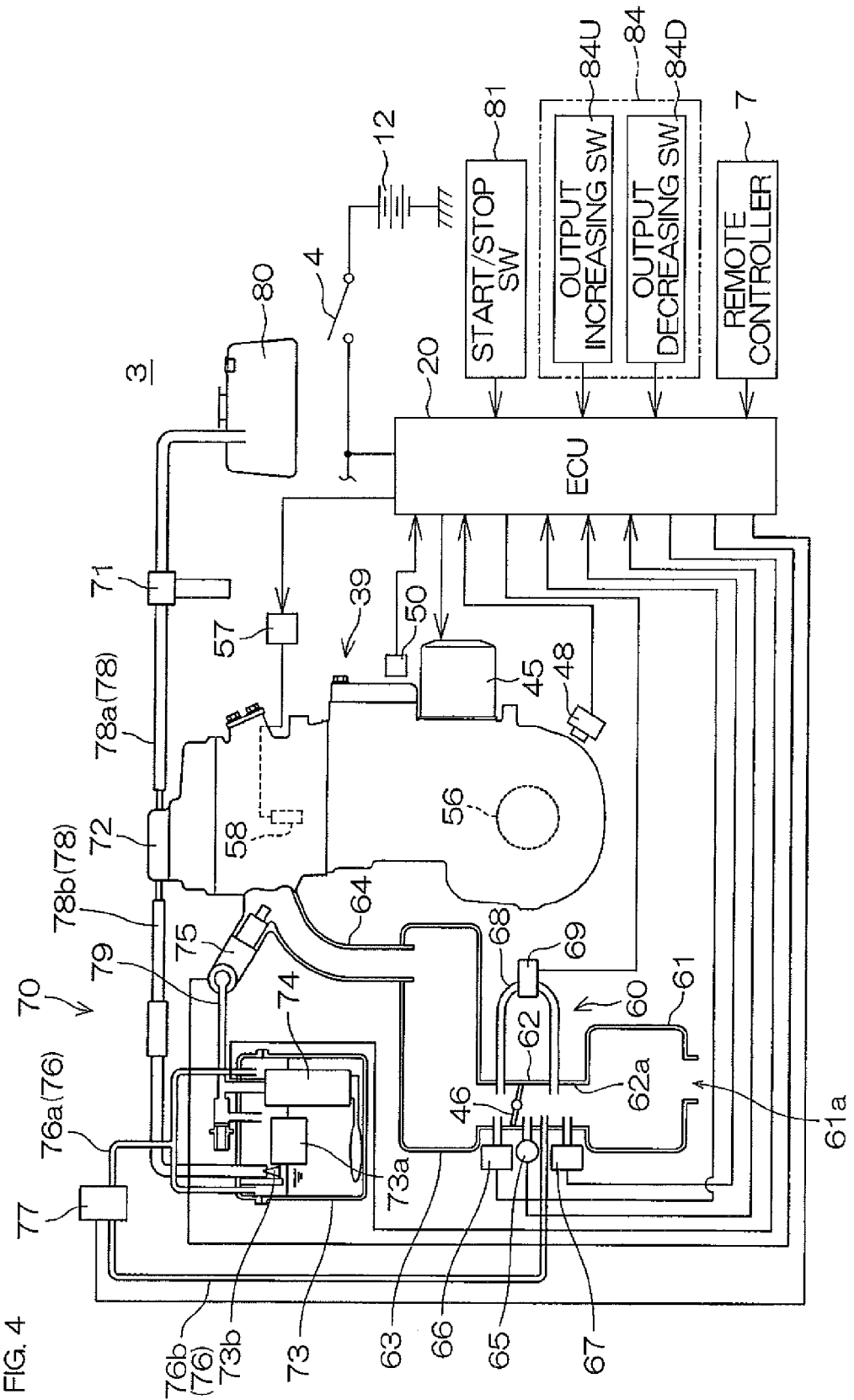
FIG. 4 is a diagram for describing an engine system that includes an engine provided in the outboard motor.

FIG. 4 is a diagram for describing the engine system including the engine 39. The engine system includes the engine, preferably an internal combustion engine, 39, an air intake system 60, a fuel system 70, and the ECU 20 as the control unit. The air intake system 60 supplies air to the engine 39. The fuel system 70 supplies fuel to the engine 39. The engine 39 may, for example, be a four-stroke cycle engine that uses gasoline for fuel.

In association with the engine 39, the engine speed sensor 48 and an engine temperature sensor 50 are preferably provided. The engine speed sensor 48 includes a crank angle sensor that generates a pulse signal in accordance with the rotation of the crankshaft 56 of the engine 39. The ECU 20 can calculate the engine speed based on an output signal of the engine speed sensor 48.

The air intake system 60 includes, for example, a silencer case 61, a throttle body 62, a surge tank 63, and an air intake tube 64 for each cylinder of the engine 39, which define the air intake passage. The silencer case 61 includes an air intake port 61a that is open to the atmosphere. The throttle body 62 is connected to the silencer case 61. The surge tank 63 is connected to the throttle body 62. The air intake tube 64 for each cylinder extends from the surge tank 63 and is connected to an air intake port of the corresponding cylinder of the engine 39.

The throttle body 62 includes an air passage 62a with an inner surface preferably having a cylindrical shape. The throttle valve 46 is preferably a butterfly type valve, and is provided in the air passage 62a.

In order to collect information used to control a fuel injection amount of an injector 75, to be described below, a throttle opening degree sensor 65, an intake air pressure sensor 66, and an intake air temperature sensor 67 are attached to the throttle body 62. The throttle opening degree sensor 65 detects the opening degree of the throttle valve 46. The intake air pressure sensor 66 detects a pressure of the air taken in via the air passage 62a. The intake air temperature sensor 67 detects a temperature of the air taken in via the air passage 62a.

A bypass passage 68 is provided integral to the throttle body 62. The bypass passage 68 connects an upstream side and a downstream side with respect to the throttle valve 46 of the air passage 62a. In other words, the bypass passage 68 bypasses the throttle valve 46 to place a side of the air passage 62a that is closer to the engine 39 than the throttle valve 46 in communication with the atmosphere. An on/off valve 69 is interposed in the bypass passage 68. The on/off valve 69 is a valve that is controllable to a closed state (off state) of closing off the bypass passage 68 and an open state (on state) of opening the bypass passage. To be more specific, the on/off valve 69 is controllable to the closed state and the open state but cannot be controlled to an intermediate opening degree between the open state and the closed state. The bypass passage 68 is designed, for example, so that when the on/off valve 69 is put in the open state, air flows through at a flow rate that is necessary and sufficient to maintain the idling engine speed of the engine 39.

The fuel system 70 includes a filter 71, a low pressure fuel pump 72, a vapor separator tank 73, a high pressure fuel pump 74, an injector 75, a vapor piping 76 (76a and 76b), a vapor shut valve (VSV) 77, and a fuel piping 78 (78a and 78b).

The low pressure fuel pump 72 is driven by the engine 39. The low pressure fuel pump 72 and a fuel tank 80, disposed in the hull 2, are connected by the fuel piping 78a, and the filter 71 is interposed in the fuel piping 78a. The filter 71 traps foreign matter in the fuel. Further, the low pressure fuel pump 72 and the vapor separator tank 73 are connected by the fuel piping 78b. The low pressure fuel pump 72 pumps out fuel from the fuel tank 80 and supplies the fuel via the fuel piping 78 (78a and 78b) to the vapor separator tank 73.

The vapor separator tank 73 stores the fuel pumped up from the fuel tank 80 and separates fuel vapor or air from liquid fuel. The vapor separator tank 73 is arranged so that the fuel stored inside the vapor separator tank 73 is maintained at a fixed amount and so that a liquid level position of the fuel inside the vapor separator tank 73 is maintained at a predetermined height position. Specifically, a float 73a including a needle valve 73b is provided inside the vapor separator tank 73. The float 73a moves vertically in accordance with the liquid level height of the fuel, and the needle valve 73b opens/closes a discharge port of the fuel piping 78b accordingly. The liquid level position of the fuel inside the vapor separator tank 73 is thus maintained.

The high pressure fuel pump 74 is disposed inside the vapor separator tank 73 and transports the fuel inside the vapor separator tank 73 to the injector 75 via a delivery pipe 79. The fuel delivered at a predetermined pressure by the high pressure fuel pump 74 is injected by the injector 75 toward a vicinity of the air intake port of a cylinder (not shown) of the engine 39 at a predetermined timing.

An upper portion of the vapor separator tank 73 is connected via the vapor piping 76 to the throttle body 62. Thus, the vapor inside the vapor separator tank 73 is released to the air passage 62a of the throttle body 62. The vapor shut valve (VSV) 77 is interposed in the vapor piping 76. The vapor shut valve 77 is an on/off valve that opens/closes the vapor piping 76. A timing of releasing of the vapor can be controlled by controlling the vapor shut valve 77.

The on/off valve 69 interposed in the bypass passage 68 may be an on/off valve with the same specifications as the vapor shut valve 77. In this case, there is no need to increase the types of components, and the manufacturing cost can thus be lowered.

The ECU 20 is programmed to control actuators of the high pressure fuel pump 74, the injector 75, the vapor shut valve 77, an ignition coil 57, the on/off valve 69, the starter motor 45, etc. The ignition coil 57 supplies energy for spark discharge to a spark plug 58 included in the engine 39. The spark plug 58 is disposed to perform spark discharge inside a combustion chamber of the engine 39. Electric power from a battery 12 is supplied via the key switch 4 to the ECU 20. Also, operation signals, such as an operation signal from the remote controller 7, an operation signal of the start/stop switch 81, an operation signal of the trolling output operation portion 84, etc., are input to the ECU 20. Further, detection signals from the sensors, such as the engine speed sensor 48, the engine temperature sensor 50, the throttle opening degree sensor 65, the intake air pressure sensor 66, the intake air temperature sensor 67, etc., are input into the ECU 20.

The ECU 20 is programmed to control the fuel injection amount of the injector 75 based on the detection results of the throttle opening degree sensor 65, the intake air pressure sensor 66, and the intake air temperature sensor 67. Also, when fully closed state is detected as the throttle opening degree by the throttle opening degree sensor 65, the ECU 20 sets the target engine speed based on the engine temperature detected by the engine temperature sensor 50.

During stoppage of the engine 39, the ECU 20 closes the vapor shut valve 77. When starting the engine 39, the ECU 20 opens the vapor shut valve 77. Even after the starting of the engine 39 has been completed, the ECU 20 maintains the vapor shut valve 77 in the open state during a period until a high temperature fuel inside the vapor separator tank 73 is replaced by a low temperature fuel supplied from the fuel tank 80.

FIG. 5A and FIG. 5B are diagrams for describing a characteristic control operation of the ECU 20 during the starting of the engine 39. FIG. 5A shows an on/off valve 69 opening/closing control and an ignition timing control executed by the ECU 20 during a starting period of the engine 39. FIG. 5B shows an opening degree control of an idle speed control valve (ISC) that is performed during an engine starting period in a comparative example that includes the idle speed control valve.

With the arrangement of the comparative example that includes the idle speed control valve, for example, the opening degree of the idle speed control valve (ISC opening degree) is controlled in the engine starting period to be at a fixed value (for example, 60%) that is determined in advance as shown in FIG. 5B. The starter motor is actuated and cranking and ignition control are performed in this state. The engine starts up, the engine revs up due to an initial combustion, and the engine speed increases rapidly. Thereafter, the opening degree of the idle speed control valve is decreased gradually in accordance with a temperature rise of the engine and the engine speed decreases accordingly. When the engine is sufficiently warmed up, feedback control of the opening degree of the idle speed control valve is performed based on the engine speed so that the engine speed is set at a predetermined idling engine speed.

On the other hand, with the arrangement of the present preferred embodiment, the ECU 20 controls the on/off valve 69 to be in the open state in the engine starting period as shown in FIG. 5A. Further, the ECU 20 controls the ignition timing of the spark plug 58 to be an ordinary timing (for example, a crank angle position of about 10 degrees before top dead center (about 10 degrees BT)). When in this state, the starter motor 45 is actuated and cranking is performed, the engine 39 revs up due to the initial combustion, and the engine speed increases rapidly. After completion of starting (more preferably, after elapse of a predetermined time until the engine speed stabilizes), the ECU 20 performs ignition lag control in which the ignition timing of the spark plug 58 is made slower than the ordinary timing. More specifically, the ignition timing of the spark plug 58 is changed while varying a lag amount in accordance with at least one of either of temperature change of the engine 39 and elapsed time from the completion of starting. In this case, the lag amount is set so that the higher the temperature of the engine 39, the greater the lag amount. Also, the lag amount is set so that the longer the elapsed time from the completion of starting, the greater the lag amount. When the engine 39 is sufficiently warmed up, the ECU 20 closes the on/off valve 69 and interrupts the ignition lag control of the spark plug 58 at the same time or immediately thereafter to restore the ordinary ignition timing. Thus, the engine speed is stabilized at the idling engine speed. The engine speed in the starting period can thus be controlled appropriately without using the idle speed control valve, which is an expensive, complex, and a large component. In the non-limiting example of FIG. 5A, after being lagged to about 5 degrees after top dead center (about 5 degrees AT), the ignition timing is restored to about 10 degrees before top dead center, which is the ordinary ignition timing.

FIGS. 6A and 6B are diagrams for describing non-limiting examples of dash pot control by the ECU 20. FIG. 6A shows an on/off valve 69 opening/closing control and ignition timing control executed by the ECU 20 during dash pot control. FIG. 6B shows, as a comparative example, dashpot control by controlling the opening degree of the idle speed control valve. Dash pot control is a control performed to avoid engine stall due to an insufficiency of the intake air amount when the throttle opening degree decreases rapidly.

With the arrangement that includes the idle speed control valve, when the throttle opening degree is large, the opening degree of the idle speed control valve (ISC opening degree) is set to 100% as shown in FIG. 6B. When the throttle valve is fully closed rapidly from this state, the idle speed control valve is gradually decreased in its opening degree. Thus, the engine speed is made to approach the idling engine speed without the occurrence of engine stall.

On the other hand, with the arrangement of the present preferred embodiment, when the throttle opening degree is large, the ECU 20 controls the on/off valve 69 to be in the open state as shown in FIG. 6A. When the throttle valve 46 is rapidly closed from this state, the ECU 20 maintains the on/off valve 69 in the open state while executing ignition lag control in which the ignition timing of the spark plug 58 is made slower than the ordinary ignition timing (for example, about 10 degrees before top dead center). More specifically, the lag amount is increased in accordance with the elapsed time. The engine speed gradually decreases due to this ignition lag control. When the engine speed reaches a value close to the idling engine speed, the ECU 20 closes the on/off valve 69 and sets the lag amount to zero at the same time or immediately thereafter to restore the ordinary ignition timing. Even when the throttle valve 46 is closed rapidly, air can be supplied to the engine 39 via the bypass passage 68 and extreme insufficiency of the air amount can thus be avoided and engine stall can be avoided. Dash pot control can thus be realized without using the idle speed control valve, which is an expensive, complex, and a large component. In the non-limiting example of FIG. 6A, after being lagged to about 5 degrees after top dead center, the ignition timing is restored to about 10 degrees before top dead center, which is the ordinary ignition timing.

Figure 7:
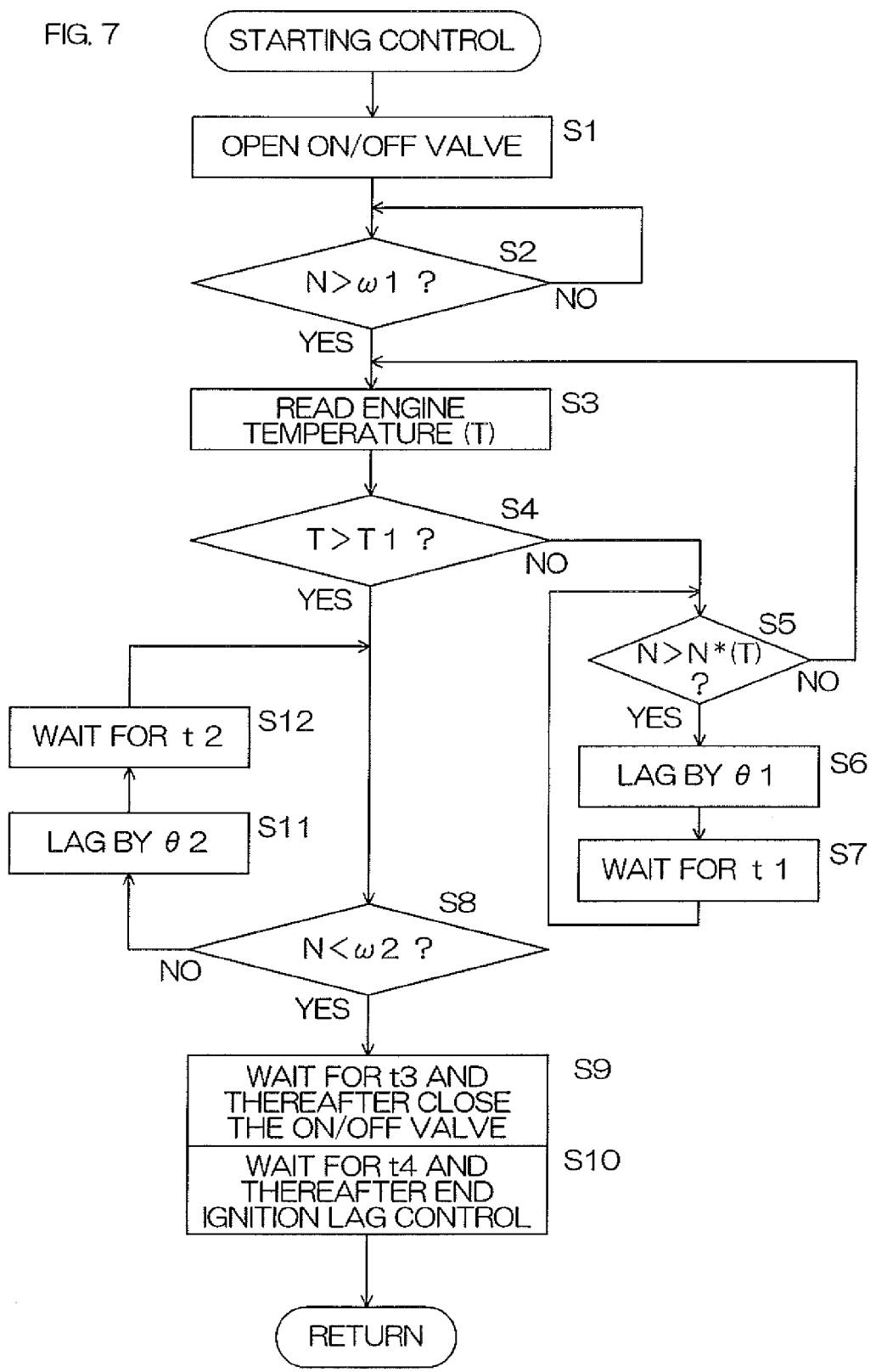
FIG. 7 is a flowchart for describing a specific non-limiting example of engine starting control in a preferred embodiment of the present invention.

FIG. 7 is a flowchart for describing details of control by the ECU 20 when the engine 39 is started. The ECU 20 executes the control shown in FIG. 7 in the starting period of the engine 39. When the key switch 4 is operated and the power from the battery 12 is supplied, the ECU 20 is started. When started, the ECU 20 controls the on/off valve 69 to be in the open state (step S1). The ECU 20 then judges whether or not the engine speed N, calculated based on the output of the engine speed sensor 48, exceeds a predetermined starting completion judgment threshold $\omega 1$ (for example, $\omega 1 = 500$ rpm) (step S2). The starting completion judgment threshold $\omega 1$ is set to a value no less than a minimum engine speed when the engine 39 is undergoing complete combustion. Whether or not the starting of the engine 39 is completed can thus be judged.

When the starting of the engine 39 is completed (step S2: YES), the ECU 20 reads the engine temperature T detected by the engine temperature sensor 50 (step S3) and, based on the read engine temperature T, judges whether or not warm-up of the engine 39 is completed (step S4). Specifically, the ECU 20 judges whether or not the temperature T of the engine 39 exceeds a predetermined warm-up completion threshold T1 (for example, T1=60° C.). If the warm-up of the engine 39 is incomplete (step S4: NO), the ECU 20 executes a control to warm up the engine 39 (step S5 to S7).

Specifically, the ECU 20 has a warm-up map in an internal memory. A non-limiting example of the warm-up map is shown in FIG. 8. The warm-up map is provided in a table in which the engine temperatures are associated with the corresponding target engine speeds. In the non-limiting example of FIG. 8, appropriate target engine speeds are preferably set for engine temperatures of 10° C. intervals from to 60° C., for example. The lower the engine temperature, the more likely the occurrence of engine stall, and thus a higher target engine speed is set.

The ECU 20 references the warm-up map and reads the target engine speed N*(T) corresponding to the engine temperature T and judges whether or not the actual engine speed N is higher than the target engine speed N*(T) (step S5). If the engine speed N is higher than the target engine speed N*(T) (step S5: YES), the ECU 20 makes the ignition timing of the spark plug 58 lag by a predetermined angle $\theta 1$ (for example, $\theta 1 = 1$ degree) from the current ignition timing (step S6). The engine output is thus decreased and the engine speed decreases. The ECU 20 then waits for a predetermined time t1 (for example, t1=1 second) corresponding to a response delay of the engine 39 with respect to the lag (step S7) and thereafter judges again whether or not the current engine speed N is higher than the target engine speed N*(T) (step S5). When the engine speed N becomes no more than the target engine speed N*(T) (step S5: NO), the ECU 20 reads the engine temperature T detected by the engine temperature sensor 50 (step S3) and compares the read engine temperature T with the warm-up completion threshold T1 (step S4).

By repeating such operations, the target engine speed is decreased in a stepwise manner with an increase of the engine temperature T in accordance with the warm-up map (see FIG. 8) and the ignition timing is lagged accordingly. The engine speed N is thus decreased. Warm-up of the engine 39 is thus performed.

When the warm-up of the engine 39 ends (step S4: YES), the ECU 20 judges whether or not the current engine speed N is less than an idling threshold $\omega 2$ (for example, $\omega 2 = 1000$ rpm) (step S8). If the current engine speed N is less than the idling threshold $\omega 2$ (step S8: YES), waiting is performed for a predetermined time t3 (for example, t3=0.1 seconds) and thereafter the on/off valve 69 is closed (step S9). Also, the ECU 20 waits for a predetermined time t4 (t4≥t3; for example, t4=0.1 seconds) and thereafter ends the ignition lag control and restores the ordinary ignition timing (step S10).

The starting control is thus ended and the engine speed N stabilizes at the idling engine speed.

There is a time lag between the point at which the on/off valve 69 is closed and the point at which the influence thereof becomes apparent in the operation of the engine 39. This time lag is mainly due to the time it takes for air to reach the cylinder of the engine 39 from the on/off valve 69. When the ignition lag control is ended, on the other hand, the influence thereof becomes apparent in the operation of the engine 39 immediately. The predetermined times t3 and t4 are thus preferably set so that the timing at which the influence of closing the on/off valve 69 becomes apparent in the operation of the engine 39 matches the timing at which the influence of ending the ignition lag control becomes apparent in the operation of the engine 39. The influence due to closing the on/off valve 69 and the influence due to ending the ignition lag control can thus be made to cancel each other out to keep the behavior of the engine 39 stable.

When starting is performed in a state in which the engine 39 is sufficiently warmed up, an affirmative judgment is made in step S4 and thereafter it is judged in step S8 that the current engine speed N is no less than the idling threshold ω2 (step S8: NO). In this case, the ECU 20 delays the ignition timing by a predetermined angle θ2 (for example, θ2=1 degree) each time at intervals of a predetermined time t2 (for example, t2=2 seconds) and makes the engine speed N approach the idling threshold ω2 (steps S8, S11, and S12). After the engine speed has been gradually decreased and made to approach the idling engine speed, waiting for the predetermined time t3 is performed and thereafter the on/off valve 69 is closed (step S9), and then after waiting for the predetermined time t4, the ignition lag control is ended and the ordinary ignition timing is restored (step S10). The starting control is ended and the engine speed N stabilizes at the idling engine speed.

In the engine starting process, the on/off valve 69 is thus opened to secure a sufficient intake air amount and improve starting performance, and after the completion of engine starting, the engine speed is made to approach the idling engine speed gradually by the ignition lag control. Thus, there is no need to repeatedly open/close the on/off valve 69 in a short time, and occurrence of a perceptible variation in the output of the engine 39 and generation of abnormal noise can thus be avoided. Smooth engine starting is thus enabled without using the idle speed control valve, which is an expensive, complex, and a large component, and the outboard motor 3 can thus be reduced in cost without compromising marketability.

Figure 9:
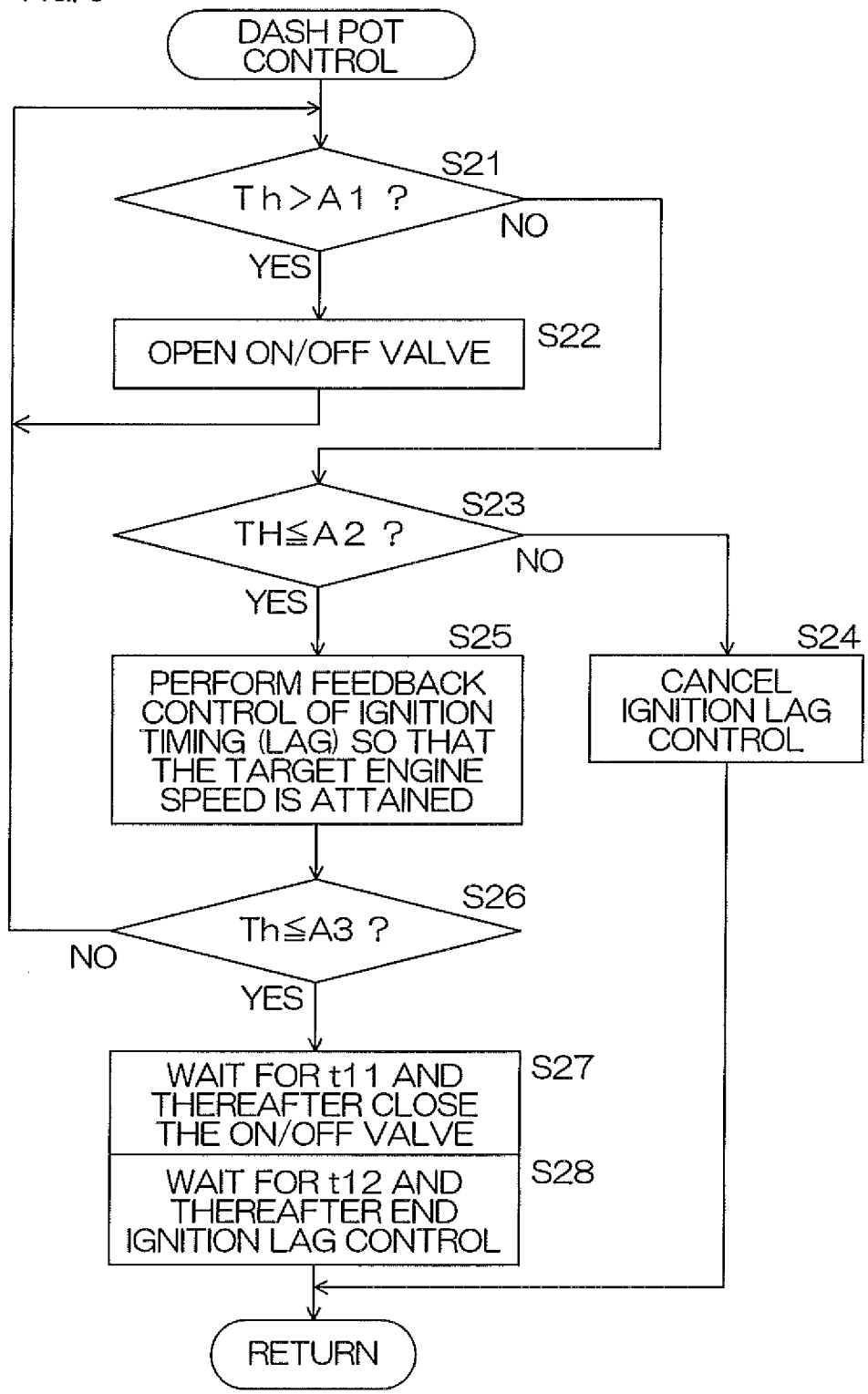
FIG. 9 is a flowchart for describing a specific non-limiting example of the dash pot control in a preferred embodiment of the present invention.

FIG. 9 is a flowchart for describing a specific non-limiting example of the dash pot control by the ECU 20. After the starting control shown in FIG. 7, the ECU 20 repeatedly executes the process shown in FIG. 9. The ECU 20 monitors the output of the throttle opening degree sensor 65 and judges whether or not the throttle opening degree Th (for example, 0 degrees≤Th≤90 degrees) exceeds a predetermined opening threshold A1 (for example, A1=10 degrees) (step S21). If the throttle opening degree Th exceeds the opening threshold A1 (step S21: YES), the ECU 20 opens the on/off valve 69 (step S22) and then returns to step S21. If the throttle opening degree Th is no more than the opening threshold A1 (step S21: NO), the ECU 20 maintains the state of the on/off valve 69. That is, if the on/off valve 69 is in the open state, it is kept in the open state and if it is in the closed state, it is kept in the closed state.

Further, the ECU 20 judges whether or not the throttle opening degree Th is no more than a predetermined ignition lag cancellation threshold A2 (A2<A1; for example, A2=2 degrees) (step S23). If the throttle opening degree Th exceeds the ignition lag cancellation threshold A2, the ECU 20 cancels the ignition lag control (step S24) and then repeats the process from step S21. If the throttle opening degree Th is no more than the ignition lag cancellation threshold A2, the ECU 20 performs feedback control of the ignition timing of the spark plug 58 based on the target engine speed that is in accordance with the throttle opening degree Th (step S25). That is, the engine speed is controlled by a control (mainly ignition lag control) of the ignition timing.

Further, the ECU 20 judges whether or not the throttle opening degree Th is no more than a closing threshold A3 (A3<A2<A1; for example, A3=0.5 degrees) (step S26). If the throttle opening degree Th is greater than the closing threshold A3 (step S26: NO), the process from step S21 is repeated. If the throttle opening degree Th is no more than the closing threshold A3 (step S26: YES), the ECU 20 waits for a predetermined time t11 (for example, t11=0.1 seconds) and thereafter closes the on/off valve 69 (step S27), and after waiting for a predetermined time t12 (t12≥t11; for example, t12=0.1 seconds), ends the ignition lag control and restores the ordinary ignition timing (step S28). The predetermined times t11 and t12 may be determined in the same manner as the predetermined times t3 and t4.

When the vessel operator is making the vessel 1 run with the throttle opening degree Th being fully open (Th=90 degrees), the on/off valve 69 is in the open state (see step S22). Even if the vessel operator rapidly closes and sets the throttle opening degree Th to fully closed (Th=0 degrees) from this state, the on/off valve 69 is in the open state and thus air is supplied to the cylinder of the engine 39 through the bypass passage 68. Engine stall due to an insufficient air amount can thus be avoided. Then, the on/off valve 69 is closed after the elapse of at least the predetermined time t11 (see step S27). When the fuel supply amount becomes low, therefore, the air amount taken into the engine 39 becomes low, the air-fuel ratio is maintained in an appropriate range, and the engine 39 is maintained in the operation state at the idling engine speed.

On the other hand, when the throttle opening degree Th decreases from a value greater than the opening threshold A1 to a minute opening degree in a range of A2 to A3, the on/off valve 69 is kept in the open state, while feedback control based on the target engine speed that is in accordance with the throttle opening degree Th is performed by control of the ignition timing. That is, the on/off valve 69 is in the open state and there is thus a possibility for the air amount to become excessive with respect to the target engine speed in accordance with the throttle opening degree so that the engine speed cannot be decreased to the target engine speed in accordance with the minute throttle opening degree Th. Therefore, in the present preferred embodiment, the output of the engine 39 is adjusted by a control (mainly ignition lag control) of the ignition timing and the target engine speed that is in accordance with the minute throttle opening degree Th is achieved despite the on/off valve 69 being in the open state. Control of the engine speed is thus performed appropriately even in the minute throttle opening degree range.

The on/off valve 69 is thus opened when the engine speed increases and therefore the air amount does not become insufficient even when the throttle is closed rapidly. The engine speed is then made to approach the idling engine speed gradually by the ignition lag control. There is thus no need to repeatedly open/close the on/off valve 69 in a short time and occurrence of a perceptible variation in the output of the engine 39 and generation of abnormal noise can thus be avoided. Smooth engine starting is thus enabled without using the idle speed control valve, which is an expensive, complex, and a large component, and the outboard motor 3 can thus be reduced in cost without compromising marketability.

Figure 10:
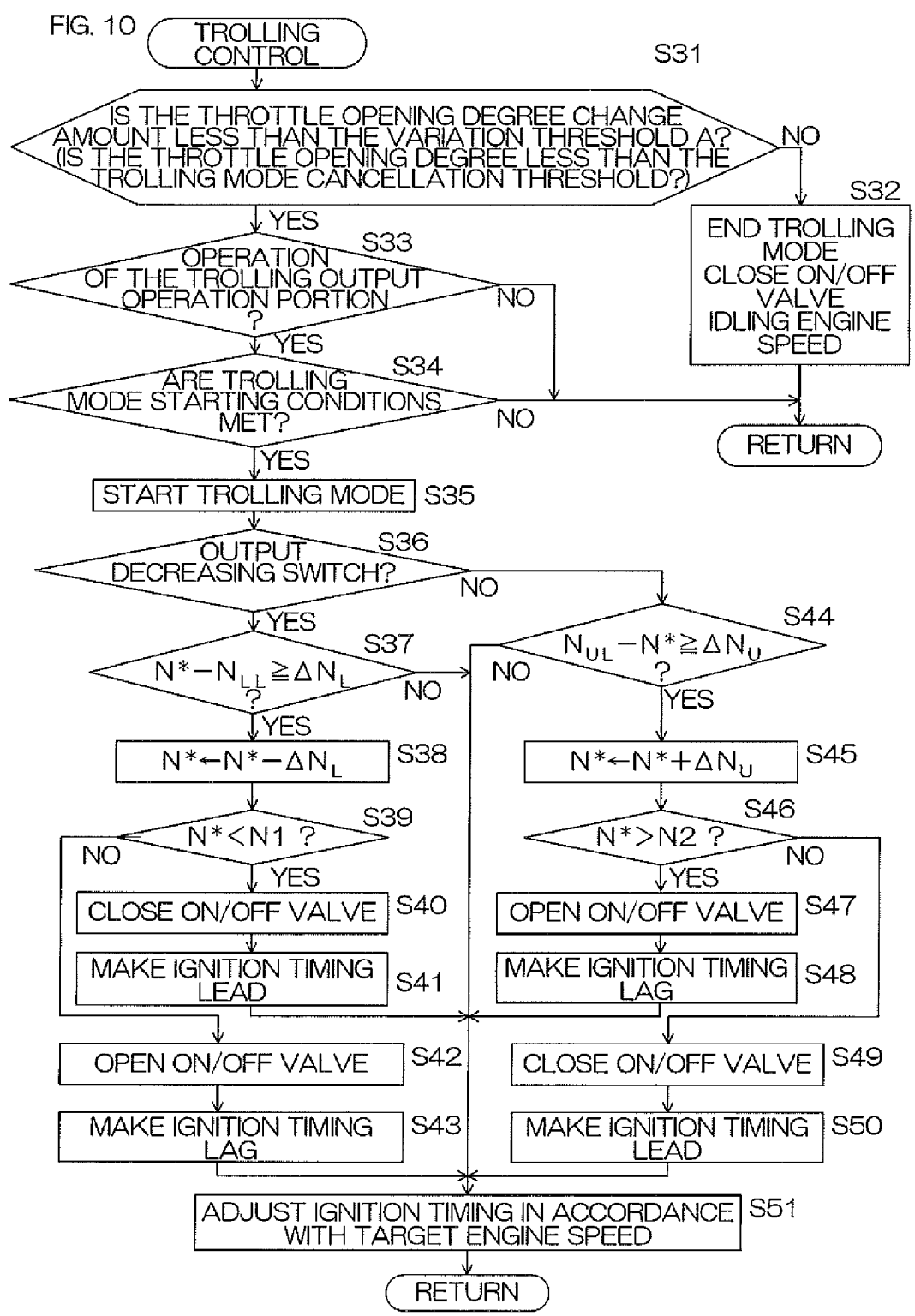
FIG. 10 is a flowchart for describing a specific non-limiting example of trolling control in a preferred embodiment of the present invention.

FIG. 10 is a flowchart for describing a specific non-limiting example of a trolling control by the ECU 20. After the engine starting control shown in FIG. 8, the ECU 20 is programmed to repeatedly execute the process shown in FIG. 10. The ECU 20 includes a plurality of control modes and controls the outboard motor 3 while switching among these control modes. The plurality of control modes preferably include the trolling mode and the ordinary mode. The trolling mode is a control mode in which the engine output is varied in accordance with operation of the trolling output operation portion 84 in the state in which the throttle opening degree is fully closed. The ordinary mode is a control mode in which the engine output is determined in accordance with the operation of the lever 7a of the remote controller 7, that is, in accordance with the throttle opening degree and is not made to respond to the operation of the trolling output operation portion 84.

The ECU 20 references and records the output signal of the throttle opening degree sensor 65 to judge whether or not a change amount (absolute value) of the throttle opening degree Th since switching of the control mode to the trolling mode is less than a predetermined variation threshold A (A>0) (step S31). When the change amount of the throttle opening degree Th reaches the variation threshold A, the ECU 20 ends the trolling mode (step S32). That is, the control mode is switched to the ordinary mode. The judgment in step S31 may be replaced by a judgment of whether or not the throttle opening degree Th is less than a predetermined trolling mode cancellation threshold. That is, the trolling mode may be ended when the throttle opening degree Th reaches the trolling mode cancellation threshold.

In the present preferred embodiment, the throttle valve 46 is preferably mechanically coupled to the remote controller 7 by the throttle cable 14 and thus the throttle opening degree Th detected by the throttle opening degree sensor 65 corresponds to the operation amount (accelerator operation amount) of the remote controller 7.

In the present specific non-limiting example, the engine output is varied in the trolling mode by a combination of the opening/closing of the on/off valve 69 and the adjustment (more specifically, the ignition lag control) of the ignition timing of the spark plug 58. Thus, when the trolling mode is ended, the ignition timing is returned to the ordinary ignition timing. The ordinary ignition timing is, for example, the crank angle position of about 10 degrees before the top dead center. Also, the on/off valve 69 is put in the closed state and the engine speed is controlled to be at the idling engine speed.

The ECU 20 is programmed to further judge whether or not the output increasing switch 84U or the output decreasing switch 84D of the trolling output operation portion 84 is operated (step S33). If operation of the output increasing switch 84U or the output decreasing switch 84D of the trolling output operation portion 84 is detected (step S33: YES), the ECU 20 is programmed to judge whether or not trolling mode starting conditions are met (step S34). The trolling mode starting conditions may be that the engine speed N is the idling engine speed and the throttle opening degree Th is fully closed (Th=0 degrees). These conditions are met in an idling state in which the lever 7a of the remote controller 7 is at the forward drive shift-in position. In this state, the shift position is the forward drive position and the engine 39 is operated at the idling engine speed.

If the trolling starting conditions are met (step S34: YES), the trolling mode is started (step S35). If the trolling mode is already started, the trolling mode is maintained as it is.

The ECU 20 is programmed to further judge whether or not the output decreasing switch 84D is operated (step S36) and if an affirmative judgment is made, to judge whether or not a difference between the current target engine speed N* and a lower limit speed $N_{LL}$ (for example, $N_{LL}$=600 rpm) is no less than a predetermined decrease width $\Delta N_L$ (for example, $\Delta N_L$=50 rpm) (step S37). If an affirmative judgment is made, the ECU 20 decreases the target engine speed N* by the decrease width $\Delta N_L$ (step S38). The ECU 20 further judges whether or not the target engine speed N* after the decrease is less than a first valve changeover threshold N1 (for example, N1=900 rpm) (step S39). If the target engine speed N* is less than the first valve changeover threshold N1 (step S39: YES), the ECU 20 closes the on/off valve 69 (step S40) and makes the ignition timing lead (step S41). That is, the intake air amount of the engine 39 is decreased by the closing of the on/off valve 69 and thus the ignition timing is made to lead to compensate for the engine output decrement due to the air amount decrease to enable the engine output to be maintained.

On the other hand, if the target engine speed N* is no less than the first valve changeover threshold N1 (step S39: NO), the ECU 20 puts the on/off valve 69 in the open state (step S42) and makes the ignition timing lag (step S43). That is, the intake air amount of the engine 39 is increased by the opening of the on/off valve 69 and thus the ignition timing is made to lag to compensate for the engine output increment due to the air amount increase to enable the engine output to be maintained.

On the other hand, if the output increase switch 84U is operated (step S36: NO), the ECU 20 judges whether or not a difference between a value determined by subtracting the current target engine speed N* from a predetermined upper limit speed $N_{UL}$ (for example, $N_{UL}$=1200 rpm) is no less than a predetermined increase width $\Delta N_U$ (for example, $\Delta N_U$=50 rpm; it is possible for $\Delta N_U = \Delta N_L$) (step S44). If an affirmative judgment is made, the ECU 20 increases the target engine speed N* by the increase width $\Delta N_U$ (step S45). The ECU 20 further judges whether or not the target engine speed N* after the increase is greater than a second valve changeover threshold N2 (for example, N2=1000 rpm; it is possible for N2=N1) (step S46). If the target engine speed N* is greater than the second valve changeover threshold N2 (step S46: YES), the ECU 20 opens the on/off valve 69 (step S47) and makes the ignition timing lag (step S48). That is, the intake air amount of the engine 39 is increased by the opening of the on/off valve 69 and thus the ignition timing is made to lag to compensate for the engine output increment due to the air amount increase to enable the engine output to be maintained. On the other hand, if the target engine speed N* is no more than the second valve changeover threshold N2 (step S46: NO), the ECU 20 closes the on/off valve 69 (step S49) and makes the ignition timing lead (step S50). That is, the intake air amount of the engine 39 is decreased by the closing of the on/off valve 69 and thus the ignition timing is made to lead to compensate for the engine output decrement due to the air amount decrease to enable the engine output to be maintained.

An initial value of the target engine speed N* immediately after the trolling mode is started is the idling engine speed (for example, 1000 rpm). In the trolling mode, the target engine speed N* is changed in a stepwise manner in response to the operation of the output increasing switch 84U or the output decreasing switch 84D and with the idling engine speed as the reference target engine speed.

After the steps S41, S43, S48, and S50, the ECU 20 is programmed to adjust the ignition timing, that is, the lag amount based on the target engine speed N* (step S51). The ignition timing is thus feedback controlled so that the engine speed N detected by the engine speed sensor 48 approaches the target engine speed N*. If negative judgments are made in steps S37 and S44, the target engine speed N* is not changed and the ignition timing is controlled so that the target engine speed N* is achieved (step S51).

The trolling mode is entered when the trolling output operation portion 84 is operated with the throttle opening degree Th being fully closed and the engine speed being the idling engine speed. In accordance with the operation of the output increasing switch 84U or the output decreasing switch 84D, the target engine speed is varied, in a range between the lower limit speed $N_{LL}$ and the upper limit speed $N_{UL}$, in a stepwise manner by the increase width $\Delta N_U$ or the decrease width $\Delta N_D$ at a time. The operator can adjust the engine output in a low engine speed region, not by a delicate lever operation of the remote controller 7, but by performing switching operation of the trolling output operation portion 84 to vary the engine speed by a minute width (for example, 50 rpm) at a time. The engine output operation during trolling is thus made easy.

Also, the variation of the engine speed by the minute width at a time is realized not by using the idle speed valve but by combining the opening/closing of the on/off valve 69 and the ignition timing control. The trolling control can thus be realized by a low-cost, simple, and compact arrangement. Moreover, there is no need to repeatedly open/close the on/off valve 69 in a short time and occurrence of a perceptible variation in the output of the engine 39 and generation of abnormal noise can thus be avoided. The outboard motor 3 can thus be reduced in cost without compromising marketability.

Although preferred embodiments of the present invention have been described above, the present invention may include other modes. For example, although in the preferred embodiments described above, whether or not the starting of the engine 39 is completed is preferably judged based on the engine speed, the completion of engine starting may be judged based on the intake air pressure detected by the intake air pressure sensor 66 or the completion of engine starting may be judged based on recovery of the battery voltage that accompanies the completion of starting of the engine 39.

Also, with the preferred embodiments described above, the trolling output operation portion 84 preferably includes the output increasing switch 84U and the output decreasing switch 84D. However, the trolling output operation portion for fine adjustment of the engine output in the trolling mode may be provided by another operating member, such as a knob (dial), etc., that is rotatably operable.

Figure 11:
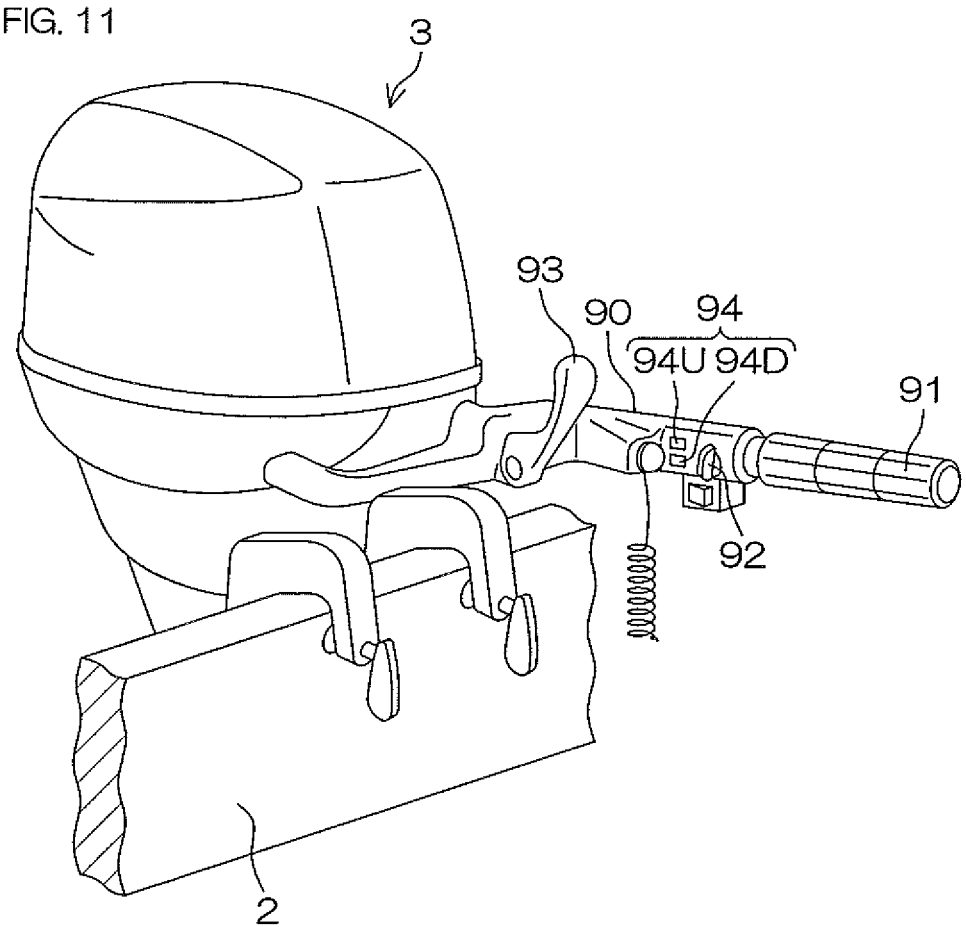
FIG. 11 is a perspective view for describing another non-limiting example of an operation system of a vessel.

Further, although with the preferred embodiments described above, the operation system preferably includes the steering operation apparatus 6 and the remote controller 7, preferred embodiments of the present invention can also be applied to an operation system such as that shown in FIG. 11. In this non-limiting example, a tiller handle 90 is coupled to the steering rod 47 (see FIG. 3) of the outboard motor 3. The vessel operator can move the tiller handle 90 to the right and left to rotate the outboard motor 3 to the right and left with respect to the hull 2 to change the direction of the propulsive force to perform steering. A throttle control grip 91 is provided at a tip portion of the tiller handle 90. The throttle control grip 91 is arranged to enable rotation around a shaft portion of the tiller handle 90. Rotation operation of the throttle control grip 91 is arranged to be mechanically transmitted to the throttle valve 46 (see FIG. 3). Also, at the tiller handle 90, a friction adjuster 92 is disposed in a vicinity of the throttle control grip 91. The friction adjuster 92 is an operating member to adjust the frictional resistance when operating the throttle control grip 91. By adjusting the frictional resistance by the friction adjuster 92, for example, the throttle control grip 91 can be fixed at any operation position. A shift lever 93 is disposed near a base portion of the tiller handle 90. The operation of the shift lever 93 is mechanically transmitted to the shift rod 44 (see FIG. 3). Also, a trolling output operation portion 94 may be provided on the tiller handle 90. As with the trolling output operation portion 84 of the preferred embodiments described above, the trolling output operation portion 94 preferably includes an output increasing switch 94U and an output decreasing switch 94D. That is, a trolling propulsion mechanism may be provided by which the target engine speed can be increased/decreased in a stepwise manner by operation of the switches 94U and 94D and with the idling engine speed as the reference target engine speed.

In the preferred embodiments described above, the operation of the accelerator operation unit (remote controller 7, throttle control grip 91) preferably is mechanically transmitted to the throttle valve. However, preferred embodiments of the present invention are also applicable to an arrangement (a so-called electronic throttle) where an operation amount of an accelerator operation unit is detected by a sensor and a throttle valve is driven by an actuator based on an output signal of the sensor.

Although in the preferred embodiments described above, the control of changing the target engine speed based on the warm-up map (see FIG. 8) is performed when the engine temperature is low during starting control, this control may be omitted. More specifically, an arrangement is possible in which, in the starting control shown in FIG. 7, a return to step S3 is performed when a negative judgment is made in step S4 and the ignition lag control is not started until the engine temperature becomes sufficiently high.

Also, in the preferred embodiments described above, an outboard motor has been described as a non-limiting example of a mechanical apparatus in which the engine system is installed, preferred embodiments of the present invention may be applied to an engine system installed in a mechanical apparatus other than an outboard motor.

The present application corresponds to Japanese Patent Application No. 2012-150726 filed in the Japan Patent Office on Jul. 4, 2012, and the entire disclosure of the application is incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An engine system comprising:
an engine;
an air intake passage that supplies air to the engine;
a throttle valve, provided in the air intake passage, that adjusts a throttle opening degree which is an opening degree of the air intake passage;
a bypass passage that supplies air to the engine and bypasses the throttle valve;
an on/off valve, provided in the bypass passage, that opens and closes the bypass passage; and
a control unit programmed to perform an ignition lag control of the engine to control an output of the engine when the on/off valve is in an open state; wherein
the control unit is programmed to judge whether or not the engine is in a starting period, and when the control unit judges that the engine is in the starting period, the control unit is programmed to control the on/off valve to be in the open state and thereafter to execute the ignition lag control of the engine.

2. The engine system according to claim 1, wherein the control unit is programmed to further judge whether or not the starting of the engine is completed, and to start the ignition lag control of the engine after the starting of the engine has been completed.

3. The engine system according to claim 1, wherein when, after the ignition lag control has started, and the engine speed has decreased and reached a predetermined engine speed range, the control unit is programmed to control the on/off valve to be in the closed state and to end the ignition lag control of the engine.

4. The engine system according to claim 3, wherein when, after the ignition lag control has started, and the engine speed has decreased and reached the predetermined engine speed range, the control unit is programmed to wait for a predetermined time to elapse and thereafter to control the on/off valve to be in the closed state and to end the ignition lag control of the engine.

5. The engine system according to claim 1, wherein the control unit is programmed to execute the ignition lag control of the engine when a temperature of the engine is higher than a predetermined temperature.

6. The engine system according to claim 1, wherein the control unit is programmed to control the on/off valve to be in the open state when the throttle opening degree is no less than a first opening degree, and, when from this state, the throttle opening degree becomes no more than a second opening degree that is less than the first opening degree, to execute the ignition lag control of the engine while maintaining the on/off valve in the open state.

7. The engine system according to claim 6, wherein the control unit is programmed to set a target engine speed of the engine in accordance with the throttle opening degree when the throttle opening degree is no more than the second opening degree, to set the target engine speed of the engine to an idling engine speed when the throttle opening degree is no more than a third opening degree that is less than the second opening degree, and to perform the ignition lag control of the engine in accordance with the target engine speed when the throttle opening degree is in an opening degree region no more than the second opening degree.

8. The engine system according to claim 6, wherein when after the throttle opening degree becomes no more than the third opening degree, and the engine speed has decreased and reached a predetermined idling engine speed range, the control unit is programmed to control the on/off valve to be in the closed state and to end the ignition lag control of the engine.

9. The engine system according to claim 8, wherein when after the throttle opening degree becomes no more than the third opening degree, and the engine speed has decreased and reached the predetermined idling engine speed range, the control unit is programmed to wait for a predetermined time to elapse and thereafter to control the on/off valve to be in the closed state and to end the ignition lag control of the engine.

10. The engine system according to claim 1, wherein the engine is a driving source of a propulsion system of a vessel.

11. The engine system according to claim 10, further comprising:

a trolling output operation unit that is operated by an operator to adjust the output of the engine during trolling; wherein
the control unit is programmed to vary the output of the engine in accordance with the operation of the trolling output operation unit.

12. The engine system according to claim 11, wherein the control unit is programmed to set, with the output of the engine during idling as a reference output, an amount of variation of the engine output from the reference output by controlling the opening/closing of the on/off valve and the ignition timing in accordance with the operation of the trolling output operation unit.

13. The engine system according to claim 12, wherein the trolling output operation unit outputs commands in a plurality of steps in accordance with the operation by the operator; and
the control unit is programmed to vary the engine output with respect to the reference output by a plurality of stepped amounts in accordance with the commands output from the trolling output operation unit.

14. The engine system according to claim 11, wherein the trolling output operation unit includes an output increasing operating member that increases the engine output, and the control unit is programmed to increase the engine output by a predetermined amount in response to an operation of the output increasing operating member.

15. The engine system according to claim 11, wherein the trolling output operation unit includes an output decreasing operating member that decreases the engine output, and the control unit is programmed to decrease the engine output by a predetermined amount in response to operation of the output decreasing operating member.

16. The engine system according to claim 10, wherein the control unit is programmed to vary the target engine speed based on a reference target engine speed in accordance with the reference output, and to control the engine so that the target engine speed is attained.

17. The engine system according to claim 10, wherein the control unit is programmed with a plurality of control modes including an ordinary mode of controlling the engine output in accordance with an operation amount of an accelerator operation unit, and a trolling mode of varying the engine output in accordance with the operation of the trolling output operation unit.

18. The engine system according to claim 17, wherein the control unit is programmed to cancel the trolling mode in response to an operation amount of the accelerator operation unit becoming no less than a predetermined operation amount, or in response to the operation amount of the accelerator operation unit varying by no less than a predetermined value after initiation of the trolling mode.

19. The engine system according to claim 10, wherein the control unit is programmed to vary the engine output by opening the on/off valve by making the ignition timing lag when the target engine speed is no less than a predetermined first threshold, and by closing the on/off valve and making the ignition timing lead when the target engine speed is less than a predetermined second threshold.

* * * * *